United States Patent [19]

Hasegawa

[11] 3,985,903

[45] Oct. 12, 1976

[54] PROCESS FOR TREATMENT OF FISH MEAT TO PRODUCE RAW MATERIAL FOR PRODUCTION OF POWDERED FISH MEAT RETAINING FRESH MEAT ACTIVITY

[75] Inventor: Yoshisuke Hasegawa, Hokkaido, Japan

[73] Assignee: Mitsubishi Corporation, Tokyo, Japan

[22] Filed: June 28, 1974

[21] Appl. No.: 484,345

[30] Foreign Application Priority Data

June 29, 1973 Japan.................................. 48-72821

[52] U.S. Cl................................. 426/257; 426/644; 426/646; 426/456; 426/471; 426/574
[51] Int. Cl.² ........................................... A23L 1/22
[58] Field of Search ........... 426/254, 257, 376, 539, 426/643, 646, 471, 657, 456, 574; 252/186, 188

[56] References Cited
UNITED STATES PATENTS

| | | |
|---|---|---|
| 3,202,514 | 8/1965 | Burgess...................................... 99/2 |
| 3,264,116 | 8/1966 | Gray....................................... 99/140 |
| 3,454,405 | 7/1969 | Beach.................................... 426/376 |
| 3,529,975 | 9/1970 | Gray....................................... 99/140 |
| 3,707,381 | 12/1972 | Sharp...................................... 99/18 |
| 3,922,372 | 11/1975 | Hasegawa........................... 426/574 |

FOREIGN PATENTS OR APPLICATIONS

| | | |
|---|---|---|
| 46-39,059 | 1970 | Japan.................................. 426/376 |
| 45-3,185 | 1971 | Japan.................................. 426/376 |

Primary Examiner—Hiram H. Bernstein
Attorney, Agent, or Firm—Lane, Aitken, Dunner & Ziems

[57] ABSTRACT

Fish meat as raw material suitable for the manufacture of fish meat powder retaining fresh meat activity is obtained by subjecting low fat fish meat to a bleaching using an aqueous solution of a fatty acid ester of sugar alcohol or sucrose or a mixture thereof in the presence of dissolved calcium or magnesium ions. The pH of the bleaching solution is adjusted to approximately the isoelectric point of the particular fish meat protein being processed.

12 Claims, No Drawings

PROCESS FOR TREATMENT OF FISH MEAT TO PRODUCE RAW MATERIAL FOR PRODUCTION OF POWDERED FISH MEAT RETAINING FRESH MEAT ACTIVITY

BACKGROUND OF THE INVENTION

This invention relates to a process for the treatment of fish meat to produce a raw material suitable for the manufacture of powdered fish meat retaining fresh meat activity.

The term "fresh meat activity" as used herein has reference to an undenatured product. Undenatured powdered fish meat has the ability to recover or assume a jelly strength approximating that of a ground paste of fresh fish meat, upon being mixed and kneaded intimately with suitable amounts of water (generally 4 to 5 times the volume of fish meat) and common salt (generally about 3% sodium chloride based on the total weight of powdered fish meat and water).

The present inventor has invented several processes for manufacturing powdered fish meat retaining fresh meat activity (U.S. Application Ser. No. 246,972, filed Apr. 24, 1972, now abandoned in favor of U.S. Ser. No. 555,631, filed March 5, 1975). In these prior processes, however, the majority, as much as 80%, of the sarcoplasmic protein (water-soluble protein generally accounting for 20 to 28% of the whole proteins of fish meat) is inevitably washed away and lost when the fish meat sol raw material is subjected to various conditioning treatments, particularly bleaching, for the production of fish meat powder. With such processes, therefore, it is difficult to improve the yield of product with respect to the fish meat raw material.

In fishes belonging to the Vertebrata, the fish meat protein fundamentally consists of:
1. Water-soluble proteins globular proteins such as myoalbumin, myogen, globulin, etc. (otherwise called sarcoplasmic protein),
2. Salt-soluble proteins fibrous proteins such as actomyosin, tropomyosin, actinine, etc. (otherwise called structural protein), and
3. Stroma proteins (collagen and elastin consisting of connective tissues, ducts and cellular membranes of muscles).

Generally, in the bleaching step employed in preparation of raw ground fish meat paste, the greater part of the aforementioned water-soluble proteins are washed away and lost. In the straining step which follows the steps of bleaching and centrifugal dehydration, the greater part of the aforementioned stroma proteins (sinewy portion of meat, generally called second-order meat) is separated and removed. In preparing the raw ground fish meat paste, usually intended for use in the manufacture of fish paste products, therefore, it has been customary that only the muscle fibrous proteins, accounting for 63 to 76% of the whole proteins of the raw fish meat material, are recovered in the concentrated paste product. Additionally, the waste water which issues from the conventional processes for the preparation of raw ground fish meat paste contains large amounts of the above-described water-soluble proteins and, therefore, represents a potential or actual environmental pollution problem.

In preparing ground fish meat pastes for frozen storage, the prior art method, described above, may avoid, to an extent, the possibility of the protein being denatured in storage. Nevertheless, in the manufacture of powdered fish meat to which the present invention is directed, it is highly desirable, from the viewpoint of improving the product yield and preventing environmental pollution, that loss of water-soluble proteins in waste water should be prevented to the fullest possible extent.

SUMMARY OF THE INVENTION

It has now been discovered that when low fat fish meat is collected by conventional methods from raw fish and the collected meat (generally called "Otoshimi" or "cuts meat") is subjected to the bleaching treatment of the present invention, the greater part of the water-soluble proteins present in the fish meat is electrostatically adsorbed onto the myofibrillar protein (with the water-soluble proteins caused to penetrate in an interwinding manner onto the myofibrillar protein) and, as a consequence, the loss of the water-soluble proteins in the waste water during the bleaching step is appreciably reduced. The bleaching treatment of the present invention employs, as a bleaching medium, an aqueous solution of a fatty acid ester of sugar alcohol or sucrose or a mixture thereof in conjunction with dissolved calcium or magnesium ions. The pH of the bleach solution is adjusted to a value approximating the isoelectric point of the protein of the fish meat. When this aqueous solution is used to bleach the fish meat, almost all of both the salt-soluble and stroma proteins and about 80% of the water-soluble fraction of proteins are retained within the raw ground fish meat paste.

Accordingly, it is an object of this invention to enable the fish meat, used as the raw material in the preparation of raw ground fish meat paste, to retain its protein to the greatest extent possible with a view toward improving the yield of the powdered fish meat and, at the same time, lowering the organic matter content of the waste water resulting from the process and thereby lessening environmental pollution.

DESCRIPTION OF THE PREFERRED EMBODIMENTS

As previously indicated, the present invention is a method for bleaching meat using an aqueous solution of a fatty acid ester of sugar alcohol or surcrose or a mixture thereof in the presence of dissolved calcium or magnesium ions. The bleach solution has a pH value adjusted to approximately the isoelectric point of the fish meat being processed.

The fish meat to be used as the raw material for the present invention preferably has a low fat content in order to enable the powdered fish meat product to be better preserved. From the viewpoint of low fat content, desirable species of the fish include Alaska pollack (Suketodara), trickle back (Warazuka) and northern cod (Komai) for example. The fish meat should be collected from fish as fresh as possible, preferably from pre-rigor fish. In short, fish which still retain a high degree of freshness up to the onset of rigor mortis and which are caught during the stage of feeding or immediately before spawning are most desirable. Fish meat collected from frozen fish can also be used. Collection of the meat from fish can be satisfactorily accomplished using conventional methods.

Fatty acid esters of sugar alcohol and sucrose for use in the bleaching solutions of the present invention include sorbit, xylit, mannit, etc. The most desirable of these esters are those with higher fatty acid components having 16 to 18 carbon atoms. These fatty acid esters which are to be used in the present invention are amphophilic and nonionic surface active agents. Of these, esters having low H.L.B. values and high hydrophobic esters are more advantageous. It follows that the use of tri-form esters is preferred to that of mono- or di-form esters. Two or more types of these esters can be used in combination. When combined, the ratio of the mono-type ester having a high hydrophilic group (—OH) content to the di- or tri-form ester having a high hydrophobic group ester (—OOCR) should be at least 2 : 1. For bleaching the fish meat, the fatty acid ester or esters are required to be dissolved in the bleaching water in an amount of 0.001 to 0.002% by weight based on the weight of the fish meat (cuts meat) to be bleached.

The source of calcium or magnesium ions, which are used in combination with such fatty acid esters, is generally calcium chloride or magnesium chloride, dissolved in the bleaching water to give a pH of about 6.2. These salt ions provide the intended effect even when used in very small amounts, e.g. on the order of 0.0004% based on the fish meat (cuts meat). The dissolved salts should be brought into uniform contact with the protein of fish meat. To satisfy this latter requirement, an aqueous solution of about 2% calcium chloride or magnesium chloride is prepared in advance and then mixed uniformly in a measured amount with the bleaching water and, thereafter, the fish meat (cuts meat) is immersed in the resultant solution and thoroughly mixed by agitation. In bleaching operations conducted on an industrial scale, the required uniform contact can effectively be achieved by combining the operations of aeration and mechanical agitation.

The bleaching of the present invention can be conducted in one stage by immersing the collected fish meat (cuts meat) in an aqueous solution containing the fatty acid ester and calcium or magnesium ions dissolved in faucet water (or industrial service water adjusted to pH 6.2). The process may also be conducted in two stages by first bleaching the fish meat in aqueous solution containing the fatty acid ester dissolved therein and subsequently immersing the fish meat in an aqueous solution containing dissolved calcium or magnesium ions. In carrying out the bleaching operation of the present invention, the aqueous solution serving as the bleaching liquor must have its pH value adjusted in the neighborhood of the isoelectric point of the protein of fish meat being processed. Generally, it is satisfactory to have the pH of the aqueous solution adjusted to a value of 6.2 ± 0.1. The faucet water or the industrial service water which is used as the bleaching water generally have pH values in the neighborhood of neutrality. Adjustment of such water to the aforementioned pH range, therefore, can be accomplished by adding a very small amount of an organic acid such as acetic acid, which is harmless from the standpoint of food hygiene. When the bleaching operation is carried out in two stages as described above, the aqueous solution used in each stage must have its pH adjusted to a value of 6.2 ± 0.1.

Since the aqueous bleaching solution has the potential of inducing coagulation and denaturation of the protein when its pH is on the acidic side of the isoelectric point of the fish meat protein, the pH value should be adjusted to fall slightly on the alkaline side of the isoelectric point.

When industrial service water is used to prepare the aqueous bleaching liquid, use of hard water must be avoided.

As previously noted, the loss of water-soluble proteins via the waste water resulting from the bleaching of fish meat is reduced by the process of the present invention. The reasons for this reduction are yet unknown. In the steps of collecting the meat and bleaching the meat, the fibrillar proteins of fish meat are physically ruptured and remain in the form of cuts meat. Macroscopically, the broken bits of fibrillar proteins and the meat tissues of the fish are suspended in the aqueous solution in a finely divided and separated state. Microscopically, polar hydrophylic groups (—$NH_2$, —COOH, —OH, —NH and —SH) or nonpolar hydrophobic groups (such as hydrocarbonic alkyl groups ($C_nH_{2n+1}$) and phenyl groups ($C_6H_5$), etc.) existing on the surface of or between protein molecules interact with the hydration water and free water of the aqueous solution to effect bleaching. The hydrophilic groups (—OH) and hydrophobic ester groups (—OOCR) existing within the added amphophilic fatty acid ester act to protect the polypeptide chains in the proteins from severance and to protect the hydrogen bonds such as the (1) hydrogen bonds between the CO and NH radicals and the (2) hydrogen bonds between main protein chains and side chains and between side chains of different polypeptide chains and in the spiral structures and the secondary and tertiary beta structures. Simultaneously, the hydrophobic groups in the aqueous system, i.e. the hydrophobic ester group (—OOCR) and the like which are present between nonpolar side chains and within the molecules of the surface active agent (such as fatty acid esters), are believed to effect mutual cohesion of molecules and consequently form a hydrophobic zone and thereby protect and stabilize the hydrophobic bonds in the proteins and retain the fibrillar proteins in a stable state within the aqueous bleaching solution. Further, it is believed that, in the aqueous bleaching system, the globular protein of the water-soluble fraction is electrostatically adsorbed and interwoven, in a nearly native state, on the surface of the fibrillar proteins, thereby preventing loss of the water-soluble fraction of protein via the waste water.

The calcium and/or magnesium ions present in the aqueous bleaching solution interact with the free water and the hydration water of the aqueous solution in the presence of the fatty acid ester to bring about a partial degradation of the hydrating forces or partial lossening of the side chains of the protein molecules. This effect is a pseudodenaturation approximating the "unfolding state." The calcium and/or magnesium ions electrostatically function as a divalent cation to bind the negative ions of the protein molecules as well as the electronically charged dissociative side chains on the surface of protein molecules. It is also believed that the salt ion may efficiently assist in the adsorption of the globular proteins, in an interwined state onto the fibrillar proteins.

In the bleaching of the present invention, sodium hypochlorite may be added to the bleach solution in a very small amount, e.g. 0.0001% by weight based on the fish meat (cuts meat), to provide for sterilization in the course of bleaching and at the same time to facilitate separation of any foreign matter contained in the aqueous solution system.

The fish meat, after bleaching, is decanted, drained, dehydrated and strained by conventional methods and thereafter converted into raw ground paste to serve as the starting material for the manufacture of a powdered fish meat retaining fresh meat activity.

By means of the present invention a raw ground paste is produced with yields of 57 to 58% by weight based on the weight of fish used as raw material (portions of fish remaining after removal of head and internal organs and generally called "shell meat" or "Gara"), an improvement in yield of 19 to 22% over the yields of 35 to 39% obtained by the conventional method. The overall waste water discharged from the treatment of fish meat according to the process of the present invention has a BOD below 3,000 ppm, as compared with BOD levels of 4,620 to 7,180 ppm in the waste water from the treatments according to conventional method, indicating that the amount of water-soluble proteins in the waste water is markedly reduced by the process of this invention.

The raw ground fish meat paste obtained by the process of this invention and that obtained by the conventional method are compared in Table 1 in terms of yield of meat, jelly strength (indicative of fresh meat activity) and BOD in the waste water.

TABLE 1

| Sample | | Water content (%) | Yield based on weight of shell meat (%) | Jelly strength (g) | BOD in overall waste water (ppm) |
|---|---|---|---|---|---|
| This invention | Raw ground paste A | 82 | 55.4 | 499 | 2880 |
| | paste B | 84 | 57.9 | 490 | 2460 |
| | paste C | 86 | 59.8 | 480 | 2420 |
| Raw ground paste by conventional method | | 82 | 36.5 | 496 | 7230 |

(Note 1)
The samples were prepared from the shell meat of Alaska pollack caught immediately prior to the spawning season.

(Note 2)
The values for jelly strength shown in the table were obtained by grinding a given sample of raw ground meat alone for about five minutes in a grinder, then grinding it for about 15 minutes with 2.7% by weight of common salt added thereto, and finally grinding for five minutes with 10% by weight of potato starch. The resultant fish meat sol was then packed in a casing of specified size and heated in a conventional manner. After cooling the jelly strength was measured by means of a 5-mm plunger of Okuda's jelly strength tester.

It is clear from Table 1 that the samples treated according to this invention gave yields about 20% higher than the yields for the comparative sample while showing substantially no change in jelly strength. In other words, the samples treated according to the present invention were at least equal to those processed by the conventional method in terms of "ashi" in spite of the fact that they contained water-soluble proteins in higher concentrations. The term "ashi" has reference to the jelly strength which, in turn, is a measure of rheological properties such as strong elasticity and apparent strength upon chewing. The BOD values for the waste water from the process of this invention were less than half the values obtained for the waste water of the conventional method, indicating that the degree of environmental pollution attributed to such waste water can be reduced by practice of the present invention.

The bleached meat obtained by the present invention can be converted to a powdered fish meat having fresh fish meat activity by following the process disclosed by the present inventor in U.S. application Ser. No. 246,972, filed Apr. 24, 1972.

The process described in my earlier application basically comprises the steps of converting raw ground paste of fish meat into a sol in the presence of a lower order saccharide or a sugar alcohol and a fatty acid ester thereof, adjusting the resultant sol to a pH value in the neighborhood of the isoelectric point of the protein, and instantaneously spray drying the sol. It is permissable to use, in the course of sol formation, a polyphosphate in an amount corresponding to 0.2 to 0.3% based on the weight of the raw ground paste of fish meat.

As described above, the present invention has achieved success in significantly improving the yield of the powdered fish meat produced from raw fish meat paste by considerably reducing the loss of the water-soluble fish meat proteins in the course of the bleaching operation. The powdered fish meat obtained by the process of this invention retains outstanding fresh meat activity.

The following example represents a preferred embodiment of the present invention.

EXAMPLE

Shell meat of Alaska pollack weighing 12,000 kg was stripped of fin back, triangular bond, part of the thorax and abdomen, the black film lining the intraabdominal wall and blood meat and subsequently washed with water in order to remove blood, sand and microorganisms adhering to the fish meat. The fish bodies thus cleaned were worked in a meat collecting machine to separate the meat from bone and skin to obtain what is called cuts meat. 7,440 kg of cuts meat were thus obtained which corresponded to 62% by weight of the shell meat. The cuts were divided into three lots (hereinafter referred to as A, B and C) each weighing about 2,000 kg and were subjected to the bleaching treatment.

Each 2,000 kg lot of the cuts meat was suspended in a first solution of 20 g of stearic acid tri-ester of sucrose dissolved in 12,000 kg of faucet water. A second solution containing 20 g of stearic acid tri-ester of sucrose was prepared by agitation in 1000 cc of water at 65° C for about 10 minutes in a homogenizer to convert the mixture into a micellar form. The resultant micellar system was added to the first solution/suspension and agitated. The pH was adjusted to 6.2 by addition of a small amount of 2% acetic acid, mixed for about 20 minutes by aeration and agitation while the temperature thereof was maintained below 10° C, and then allowed to stand. The supernatant phase was separated as waste water and the fish protein phase formed underneath was collected. The fish protein phase was thoroughly mixed with agitation with an aqueous solution of 3 g of sodium hypochlorite dissolved in 10,000 kg of faucet water and adjusted to a pH of 6.2. After standing, the resulting supernatant liquid was removed, and the remaining fish protein phase drained using an automatic rotary sieve. The resulting fish protein phase was bleached again by agitation in 10,000 kg of faucet water, allowed to stand at rest and then subjected to the treatments of separation and draining. The fish protein phase thus obtained was mixed by agitation for about 20 minutes with an aqueous solution of 4 g of calcium chloride dissolved in 20 kg of faucet water and the treated protein was separated from the water by means of a centrifugal separator. The fish protein was strained to give a raw ground meat paste. The stroma protein which remained at this point was finely divided with a micro-cutter in the presence of finely crushed ice and recycled to the tank containing the aqueous solution of calcium chloride for reuse in the treatment.

The yields of raw ground meat paste obtained for the different lots by the treatment described above were as follows:

| | |
|---|---|
| A | 1,108 kg (82% of water content) |
| B | 1,158 kg (84% of water content) |
| C | 1,196 kg (86% of water content) |

By processing lots A, B and C according to the method of U.S. application Ser. No. 246,972, powdered fish meat retaining fresh meat activity was manufactured from each of the samples. The powdered fish meat products were packed in a vacuum container and tested for preservability. The results are given in Table II.

TABLE II

| Sample Length of storage (month) | A | | B | | C | | Remarks |
|---|---|---|---|---|---|---|---|
| | Water content (%) | Jelly strength (%) | Water content (%) | Jelly strength (%) | Water content (%) | Jelly strength (%) | |
| 0 | 6.7 | 465 | 6.3 | 450 | 6.1 | 470 | Immediately after manufacture |
| 3 | 6.6 | 462 | 6.4 | 452 | 6.1 | 468 | Three months after manufacture |
| 6 | 6.7 | 450 | 6.3 | 440 | 6.0 | 460 | Six months after manufacture |
| 9 | 6.5 | 430 | 6.2 | 428 | 6.0 | 445 | Nine months after manufacture |
| 12 | 6.5 | 415 | 6.15 | 395 | 6.05 | 420 | Twelve months after manufacture |

It is clear from Table II given above that the powdered fish meat products manufactured from the samples A, B and C of fish meat (raw ground paste) prepared in accordance with this invention showed substantially no degradation in jelly strength over periods of up to twelve months of storage after manufacture. Table II also shows that no change was observed in water content during the periods of storage.

What is claimed is:

1. In a process for bleaching fish meat by mixing the fish meat with an aqueous solution and then separatng the aqueous solution from the fish meat as a waste liquid, the improvement comprising reducing the amount of water-soluble proteins lost in the waste liquid by using, as the aqueous bleaching solution, an aqueous solution of at least one ester of a fatty acid and a sugar and at least one salt of an alkaline earth metal, said ester being present in an amount at least 0.001% by weight based on the weight of the fish meat treated, said aqueous solution having a pH near the isoelectric point of the protein in the fish meat.

2. The process of claim 1, wherein said fatty acid ester is tri-ester of a fatty acid having 16-18 carbon atoms and a sugar.

3. The process of claim 2, wherein said sugar is sorbitol, xylitol or mannitol.

4. The process of claim 1, wherein said salt is calcium chloride.

5. The process of claim 1, wherein said salt is magnesium chloride.

6. The process of claim 1, wherein said pH is within the range of 6.2 ± 0.1.

7. The process of claim 1, wherein said alkaline earth metal is selected from calcium and magnesium.

8. The process of claim 1, wherein said sugar is sucrose.

9. In a process for bleaching fish meat wherein the fish meat is mixed with an aqueous solution and the aqueous solution is subsequently separated and discarded as a waste liquid, the improvement comprising reducing the amount of water-soluble protein lost in the waste liquid by conducting the bleaching step in two separate stages, in the first stage contacting the fish meat with a first aqueous solution containing at least one ester of a fatty acid and a sugar and subsequently, in the second stage, contacting the fish meat with a second aqueous solution containing at least one salt of an alkaline earth metal, said ester being present in the bleach solution in an amount at least 0.001% by weight based on the weight of fish meat treated, and said first and second aqueous solutions each having a pH near the isoelectric point of the protein in the fish meat.

10. The process of claim 9, wherein said alkaline earth metal is selected from calcium and magnesium, said ester is selected from esters of fatty acids having 16–18 carbon atoms and a sugar, and wherein said pH is within the range of 6.2 ± 0.1.

11. The process of claim 10, wherein said sugar is sucrose.

12. A process for the manufacture of a fish meat powder wherein water-soluble proteins are retained in the fish meat powder, said process comprising:

bleaching fish meat with an aqueous bleaching solution of at least one ester of a fatty acid and a sugar and at least one salt of an alkaline earth metal, said ester being present in the bleach solution in an amount at least 0.001% by weight based on the weight of fish meat treated, and said solution having a pH value near the isoelectric point of the protein in the fish meat;

separating said fish meat from said aqueous bleaching solution; and forming a sol of said fish meat in the presence of a sugar and a fatty acid ester thereof;

adjusting the pH of the sol to a value near the isoelectric point of the protein in the fish meat; and spray-drying said sol to form the fish meat powder.

* * * * *